United States Patent
Saily et al.

(10) Patent No.: US 10,798,519 B2
(45) Date of Patent: Oct. 6, 2020

(54) ENHANCING THE ACCURACY OF COMMUNICATION NETWORK'S KNOWLEDGE ABOUT LOCATION OF TERMINAL DEVICES

(71) Applicant: NOKIA SOLUTIONS AND NETWORKS OY, Espoo (FI)

(72) Inventors: Mikko Saily, Laukkoski (FI); Sofonias Hailu, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/755,922

(22) PCT Filed: Aug. 28, 2015

(86) PCT No.: PCT/EP2015/069746
§ 371 (c)(1),
(2) Date: Feb. 27, 2018

(87) PCT Pub. No.: WO2017/036493
PCT Pub. Date: Mar. 9, 2017

(65) Prior Publication Data
US 2018/0332431 A1 Nov. 15, 2018

(51) Int. Cl.
*H04W 4/02* (2018.01)
*H04W 60/04* (2009.01)
(Continued)

(52) U.S. Cl.
CPC .............. *H04W 4/02* (2013.01); *H04W 60/04* (2013.01); *H04W 72/048* (2013.01); *H04W 84/045* (2013.01)

(58) Field of Classification Search
CPC ..... H04W 4/02; H04W 72/048; H04W 60/04; H04W 64/00; H04W 68/08; H04W 74/00;
(Continued)

(56) References Cited

U.S. PATENT DOCUMENTS

| 2005/0117537 | A1 | 6/2005 | Okabe | |
| 2008/0026698 | A1* | 1/2008 | Koskela | H04W 60/04 |
| | | | | 455/68 |

(Continued)

FOREIGN PATENT DOCUMENTS

| CN | 102340760 A | 2/2012 |
| CN | 102457839 A | 5/2012 |

(Continued)

OTHER PUBLICATIONS

International Search Report and Written Opinion for International Application No. PCT/EP2015/069746, dated Jun. 13, 2016 (20 pages).

(Continued)

Primary Examiner — Ernest G Tacsik
(74) Attorney, Agent, or Firm — Brake Hughes Bellermann LLP

(57) ABSTRACT

There is provided a method comprising: acquiring, by a first network element of a cellular communication system providing a first cell, a location update request from a terminal device within the first cell, wherein the location update request is related to a cell level location of the terminal device, and wherein the location update request comprises a terminal device identifier; and examining that the terminal device has selected the first cell, and forwarding the location update request to a second network element of the cellular communication system.

10 Claims, 7 Drawing Sheets

(51) Int. Cl.
*H04W 72/04* (2009.01)
*H04W 84/04* (2009.01)

(58) Field of Classification Search
CPC ... H04W 74/08; H04W 92/20; H04W 74/008; H04W 74/0833; H04W 84/045; Y02D 70/1242; Y02D 70/1262; Y02D 70/1264; Y02D 70/142; Y02D 70/146; Y02D 70/21
See application file for complete search history.

(56) References Cited

U.S. PATENT DOCUMENTS

| | | | | |
|---|---|---|---|---|
| 2011/0305196 A1* | 12/2011 | Kurokawa | ............... | H04W 8/12 370/328 |
| 2012/0009890 A1* | 1/2012 | Curcio | .................... | H04L 29/06 455/230 |
| 2012/0039246 A1* | 2/2012 | Zhang | .................... | H04W 68/02 370/315 |
| 2014/0057631 A1* | 2/2014 | Zhang | .................... | H04W 48/02 455/436 |
| 2015/0208199 A1* | 7/2015 | Li | ......................... | H04W 24/08 455/456.1 |

FOREIGN PATENT DOCUMENTS

| | | |
|---|---|---|
| CN | 103975635 A | 8/2014 |
| CN | 104754632 A | 7/2015 |
| WO | 2009016260 A1 | 2/2009 |
| WO | 2010124458 A1 | 11/2010 |
| WO | 2014131017 A1 | 8/2014 |

OTHER PUBLICATIONS

3GPP TSG-RAN WG3 Meeting #89, "Introduction of information for Coverage Enhancement capable UEs", Beijing, People's Republic of China, Aug. 24-28, 2015 (12 pages).

3rd Generation Partnership Project; Technical Specification Group Services and System Aspects; General Packet Radio Service (GPRS) enhancements for Evolved Universal Terrestrial Radio Access Network (E-UTRAN) access (Release 13); 3GPP TS 23.401 V13.3.0 (Jun. 2015); Sophia Antipolis, France (324 pages).

3GPP TS 36.300 V13.0.0; 3rd Generation Partnership Project; Technical Specification Group Radio Access Network; Evolved Universal Terrestrial Radio Access (E-UTRA) and Evolved Universal Terrestrial Radio Access Network E-UTRAN); Overall description; Stage 2 (Release 13); Sophia Antipolis, France, Jun. 2015 (254 pages).

Office Action for Vietnam Application No. 1-2018-01230, dated May 7, 2018, 2 pages.

Office Action for European Application No. 15763508.7, dated Mar. 24, 2020, 24 pages.

Office Action for Chinese Application No. 201580084161.6, dated Jul. 28, 2020, 12 pages.

* cited by examiner

210 ACQUIRING, BY A FIRST NETWORK ELEMENT OF A CELLULAR COMMUNICATION SYSTEM PROVIDING A FIRST CELL, A LOCATION UPDATE REQUEST FROM A TERMINAL DEVICE WITHIN THE FIRST CELL, WHEREIN THE LOCATION UPDATE REQUEST IS RELATED TO A CELL LEVEL LOCATION OF THE TERMINAL DEVICE AND WHEREIN THE LOCATION UPDATE REQUEST COMPRISES A TERMINAL DEVICE IDENTIFIER

220 EXAMINING THAT THE TERMINAL DEVICE HAS SELECTED THE FIRST CELL, AND FORWARDING THE LOCATION UPDATE REQUEST TO A SECOND NETWORK ELEMENT OF THE CELLULAR COMMUNICATION SYSTEM

Fig. 2

310 ACQUIRING, BY A SECOND NETWORK ELEMENT OF A CELLULAR COMMUNICATION SYSTEM, A LOCATION UPDATE REQUEST IN RELATION TO A TERMINAL DEVICE FROM A FIRST NETWORK ELEMENT OF THE CELLULAR COMMUNICATION SYSTEM PROVIDING A FIRST CELL, WHEREIN THE LOCATION UPDATE REQUEST COMPRISES A TERMINAL DEVICE IDENTIFIER OF THE TERMINAL DEVICE AND WHEREIN THE LOCATION UPDATE REQUEST INDICATES THAT THE TERMINAL DEVICE HAS SELECTED THE FIRST CELL

320 BASED ON THE LOCATION UPDATE REQUEST, UPDATING CELL LEVEL LOCATION INFORMATION OF THE TERMINAL DEVICE

Fig. 3

410 SELECTING, BY A TERMINAL DEVICE OF A CELLULAR COMMUNICATION SYSTEM, A CELL AMONG ONE OR MORE CELLS OF THE CELLULAR COMMUNICATION SYSTEM

420 COMMUNICATING WITH A NETWORK ELEMENT PROVIDING THE SELECTED CELL, WHEREIN THE COMMUNICATING COMPRISES: TRANSMITTING A LOCATION UPDATE REQUEST TO THE NETWORK ELEMENT, THE LOCATION UPDATE REQUEST BEING ASSOCIATED WITH A CELL LEVEL INDICATION OF A TERMINAL DEVICE LOCATION, WHEREIN THE LOCATION UPDATE REQUEST COMPRISES A TERMINAL DEVICE IDENTIFIER AND AN INDICATION OF THE SELECTED CELL.

Fig. 4

ENHANCING THE ACCURACY OF COMMUNICATION NETWORK'S KNOWLEDGE ABOUT LOCATION OF TERMINAL DEVICES

CROSS-REFERENCE TO RELATED APPLICATIONS

This application is a national stage entry of PCT Application No. PCT/EP2015/069746filed Aug. 28, 2015, entitled "ENHANCING THE ACCURACY OF COMMUNICATION NETWORK'S KNOWLEDGE ABOUT LOCATION OF TERMINAL DEVICES"which is hereby incorporated by reference in its entirety.

TECHNICAL FIELD

The invention relates to communications.

BACKGROUND

Wireless data traffic will grow due to ultra-high resolution video streaming, cloud-based work, entertainment and increased use of a variety of wireless devices. These will comprise smartphones, tablets and machine type communications devices for the programmable world. Communications will have a wider range of use cases and related applications including video streaming, augmented reality, different ways of data sharing and various forms of machine type applications, including vehicular safety, different sensors and real-time control.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following exemplifying embodiments will be described in greater detail with reference to the attached drawings, in which

FIG. 2 illustrates a flow diagram according to an embodiment of the invention;

FIG. 3 illustrates a flow diagram according to an embodiment of the invention;

FIG. 4 illustrates a flow diagram according to an embodiment of the invention;

DETAILED DESCRIPTION OF SOME EMBODIMENTS

Figure 1A:
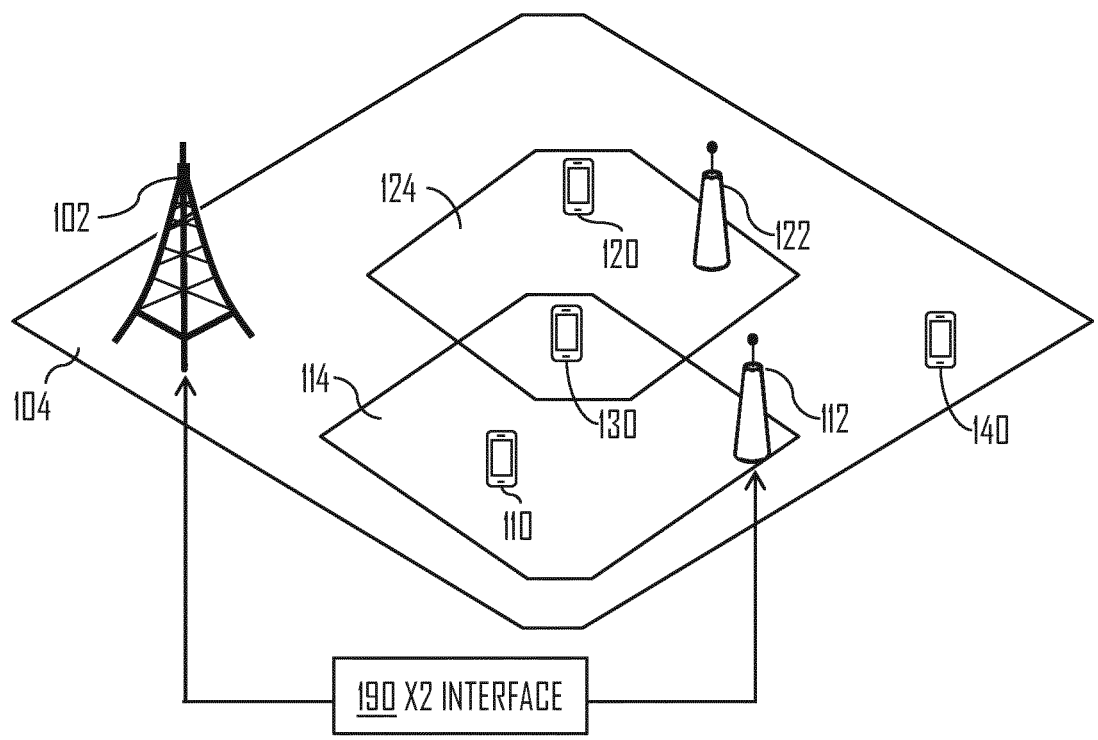
FIGS. 1A to 1B illustrate examples of a radio system to which embodiments of the invention may be applied.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented by using one or more radio access technologies, such as in at least one of the following: Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and/or 5G system. The present embodiments are not, however, limited to these systems.

The embodiments are not, however, restricted to the system given as an example but a person skilled in the art may apply the solution to other communication systems provided with necessary properties. One example of a suitable communications system is the 5G concept, as listed above. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each optimized for certain use cases and/or spectrum. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave).

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

Figure 1B:
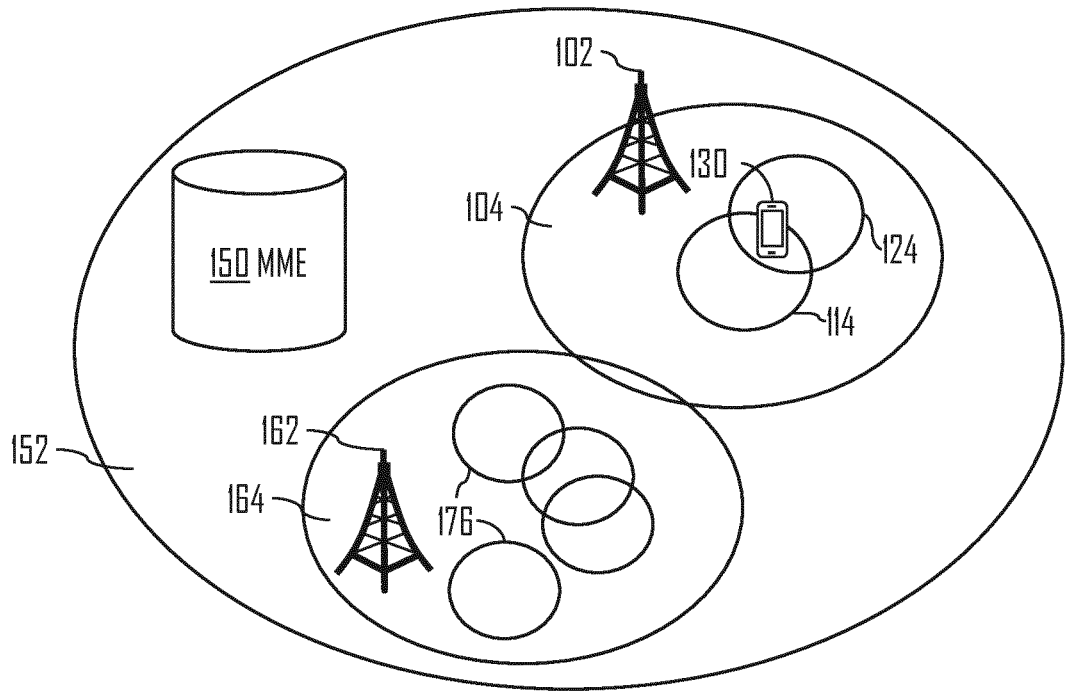

FIGS. 1A to 1B illustrate some examples of a radio system (also referred to as a cellular communication system) to which embodiments of the invention may be applied. Radio communication networks (also referred to as cellular communication networks), such as the Long Term Evolution (LTE), the LTE-Advanced (LTE-A) of the 3$^{rd}$ Generation Partnership Project (3GPP), or the predicted future 5G solutions, are typically composed of at least one network element, such as a network element 102, providing a cell 104. In the example of FIG. 1A, cells 104, 114, 124 may be shown. The cell 114 may be provided by a network element 112, and the cell 124 may be provided by a network element 122, for example. The cell 104 may be provided by the network element 102.

Each cell of the radio communication network may be, e.g., a macro cell, a micro cell, a femto, or a pico-cell, for example. Each of the network elements of the radio communication network, such as the network elements 102, 112, 122, may be an evolved Node B (eNB) as in the LTE and LTE-A, a radio network controller (RNC) as in the UMTS, a base station controller (BSC) as in the GSM/GERAN, or any other apparatus capable of controlling radio communication and managing radio resources within a cell. For 5G solutions, the implementation may be similar to LTE-A, as described above. The network elements 102, 112, 124 may be base station(s) or a small base station(s), for example. In the case of multiple eNBs in the communication network, the eNBs may be connected to each other with an X2 interface 190 as specified in the LTE. Example of this may be shown in FIG. 1A, wherein the network element 112 may be shown to be connected to the network element 102 via the X2 interface 190. Other communication methods between the network elements may also be possible. At least some of the network elements 102, 112, 122 may be further connected via an S1 interface to an evolved packet core, more specifically to a mobility management entity (MME) and to a system architecture evolution gateway (SAE-GW).

The cells 114, 124 may referred also to as sub-cells or local area cells, for example. The network elements 112, 122 may be referred to as sub-network elements or local area access nodes, for example. The cell 104 may be referred also to as a macro cell, for example. The network element 102 may be referred to as a macro network element, for example.

In an embodiment, the local area access nodes are network elements similar to the network element 102. Thus, for example, the local area access node 112 may be an eNB or a macro eNB.

The cells 104, 114, 124 may provide service for at least one terminal device 110, 120, 130, 140, wherein the at least one terminal device 110, 120, 130, 140 may be located within or comprised in at least one of the cells 104, 114, 124. The at least one terminal device 110, 120, 130, 140 may communicate with the network elements 102, 112, 122 using communication link(s), which may be understood as communication link(s) for end-to-end communication, wherein source device transmits data to the destination device. It needs to be understood that the cells 104, 114, 124 may provide service for a certain area, and thus the at least one terminal device 110, 120, 130, 140 may need to be within said area in order to be able to use said service. For example, a third terminal device 130 may be able to use service provided by the cells 104, 114, 124. On the other hand, fourth terminal device 140 may be able to use only service of the cell 104, for example.

The cells 104, 114, 124 may be at least partially overlapping with each other. Thus, the at least one terminal device 110, 120, 130, 140 may be enable to use service of more than one cell at a time. For example, the sub-cells 114, 124 may be small cells that are associated with the macro cell 104. This may mean that the network element 102 (e.g. macro network element 102) may at least partially control the network elements 112, 122 (e.g. local area access nodes). For example, the macro network element 102 may cause the local area access nodes 112, 122 to transmit data to the at least one terminal device 110, 120, 130, 140. Of course, it may also be possible to receive data, by the network element 102, from the at least one terminal device 110, 120, 130, 140 via the network elements 112, 122. To further explain the scenario, the cells 114, 124 may be at least partially within the cell 104.

The radio system of FIGS. 1A to 1B may support Carrier Aggregation (CA). CA may enable increasing usable bandwidth between the terminal devices and network elements of the radio system. For example, in the 3GPP, CA may be used for LTE-A in order to support wider transmission bandwidths enhancing increased potential peak data rates to meet LTE-A requirements. For example, more than one component carriers may be aggregated contiguously and/or non-contiguously to provide a wider bandwidth. In uplink carrier aggregation, multiple uplink component carriers may be aggregated and can be allocated in a subframe to a terminal device, such as the at least one terminal device 110, 120, 130, 140. Further, the network elements 102, 112, 122 and/or the at least one terminal device 110, 120, 130, 140 may support Dual Connectivity (DC) or Multi Connectivity with more than two communication links.

It may also be possible that the radio system of FIGS. 1A to 1B supports Machine Type Communication (MTC). MTC may enable providing service for a large amount of MTC capable devices. In MTC, the radio communication network may need to handle a massive amount of uncoordinated accesses by the MTC devices. As the amount of MTC devices may be quite high, network access may be a limiting factor, compared to the conventional network limitations, where interference and/or limited coverage may pose a problem. Most of the MTC devices may have a small amount of data to be transmitted in sporadic fashion. This may enable the MTC devices to spend majority of time in sleep mode, disconnected from the network elements 102, 112, 122 and/or the radio communication network. Thus, the MTC devices may have a requirement of very small energy consumption. However, the sporadic transmissions may cause the MTC devices to transmit an increased amount of random access requests per device as each data packet transmission may be preceded by a random access procedure. Combined with the massive number of MTC devices, increase of random access requests in the radio communication network may be inevitable.

The at least one terminal device 110, 120, 130, 140 may comprise mobile phones, smart phones, tablet computers, laptops and other devices used for user communication with the radio communication network. These devices may provide further functionality compared to the MTC schema, such as communication link for voice, video and/or data transfer. However, it needs to be understood that the at least one terminal device 110, 120, 130, 140 may also comprise MTC capable devices, such as sensor devices providing position, acceleration and/or temperature information to name a few examples. That said the radio communication network of FIGS. 1A to 1B may comprise different types of devices (e.g. phones, MTC devices) and communication methods (e.g. CA, DC). The amount of devices and data transfer requirements may increase burden of the radio communication network as, for example, the transmitted random access requests within the radio communication network may increase in numbers. The Internet of Things (IoT) may even further increase the amount of devices within the radio communication network.

Referring to FIG. 1B, a tracking area 152 related to a MME 150 may be shown. The MME 150 may control network elements, such as network elements 102, 162, within the tracking area 152. There may be sub-cells 114, 124, 176 within the cells 104, 164, wherein the sub-cells 114, 124, 176 may be provided by other network elements of the radio communication network. To give an example, the sub-cells 114 124, within the cell 104 provided by the network element 102, may be provided by the local area access nodes 112, 122. There may be more than two layers of cells in the radio communication network. For example, there may be sub-cell(s) within the sub-cells 114, 124, 176. Thus, the radio communication network may be scalable depending on, for example, operator requirements.

In radio communication network initiated procedures, paging is used for locating a terminal device. In the existence of high volume of machine type devices, having efficient paging scheme may be beneficial to minimize paging resource usage without compromising the delay to reach the terminal devices (e.g. both human and machine type terminal devices). For example, if we look at the third terminal device 130, located in the area of the cell 104 and sub-cells 114, 124, the MME 150 may not know camping area of the third terminal device 130 (e.g. does not know in which cell the terminal device 130 is located in). Therefore, if the radio communication network determines a need to reach the third terminal device (i.e. determines a need for data transfer) the paging may be sent to more network elements that might be necessary. The network element, such as an eNB, may, when receiving the paging message from the MME 150, perform paging of the terminal device (i.e. the third terminal device 130). This may mean that the paging is performed towards at least some of the sub-cells 114, 124 also.

The MME 150 may send the paging to both network elements 102, 162. Naturally, looking at the FIG. 1B the paging sent to the network element 162 may be unnecessary. Bearing in mind the increasing number of devices, the paging processes may significantly increase network load, and possibly jeopardize smooth operation of the radio communication network. It needs to be noted that the amount of different network elements may be a lot higher than that shown in FIG. 1B.

Let us now look on some embodiments of the invention illustrated by exemplifying flow diagrams of FIGS. 2, 3, and 4.

Mobility management enables mobile communications. The target of mobility management is to obtain location information on subscriber devices allowing calls and other mobile communications services to be provided to them. Part of the mobility management is a location area update procedure, wherein a terminal device informs the cellular network it is camping on when it moves from one location (or tracking area) to the next. One location area is typically one cell, but it may also be a set of cells. Location area update may also be needed when a terminal device is switched on, when it has been in a radio shadow zone or when it moves to an area it does not have in the list of location or tracking areas. Additionally, typically, a terminal device is required to regularly report its location at a set time interval using a periodic location update procedure. It should be appreciated that terminology may vary depending on a standard applied.

Enhancing the accuracy of communication network's knowledge about location of terminal devices may decrease the amount of data traffic within the network, and thus increase the efficiency of the network. For example, the network may be able to serve more devices when the load caused by a single terminal device may be decreased.

Referring to FIG. 2, in step 210, a first network element of a cellular communication system providing a first cell acquires a location update request from a terminal device within the first cell, wherein the location update request is related to a cell level location of the terminal device, and wherein the location update request comprises a terminal device identifier. In step 220, the first network element examines that the terminal device has selected the first cell, and forwards the location update request to a second network element of the cellular communication system.

The acquiring of the location update request may comprise receiving the location update request from the terminal device. For example, looking at FIG. 1A, the local area access node 112 may receive the location update request from the terminal device 110. Another example may be that the network element 102 receives the location update request from the terminal device 110 directly and/or via the local area access node 112.

Referring to FIG. 3, in step 310, a second network element of a cellular communication system acquires a location update request in relation to a terminal device from a first network element of the cellular communication system providing a first cell, wherein the location update request comprises a terminal device identifier of the terminal device, and wherein the location update request indicates that the terminal device has selected the first cell. In step 320, based on the location update request, the second network element updates cell level location information on the terminal device.

The acquiring of the location update request may comprise receiving the location update request from the first network element. For example, looking at FIG. 1A, the network element 102 may receive the location update request from the local area access node 112. Further, the location update request may be received from some other network element. For example, if the location update request is transmitted via the X2 interface (e.g. X2 interface 190), the location update request may be received via the X2 interface.

Referring to FIG. 4, in step 410, a terminal device of a cellular communication system selects a cell among one or more cells of the cellular communication system. In step 420, terminal device communicates with a network element providing the selected cell, wherein the communicating comprises: transmitting, by the terminal device, a location update request to the network element, the location update request being associated with a cell level indication of a terminal device location, wherein the location update request comprises a terminal device identifier and an indication of the selected cell.

The network elements described in relation to FIGS. 2 to 4 may be and/or be comprised in one of the network elements 102, 112, 122, for example. Thus, for example, the first network element may be a local area access node and the second network element may be a macro network element. The terminal device(s) described in relation to FIGS. 2 to 4 may be and/or be comprised in at least one of the at least one terminal device 110, 120, 130, 140.

Figure 5A:
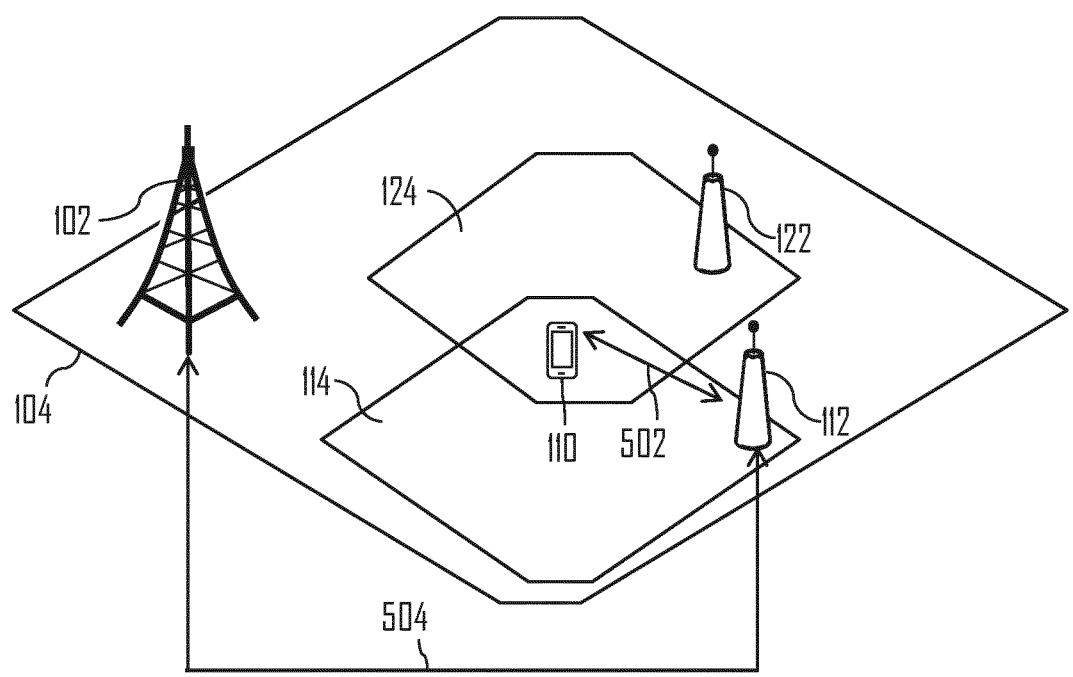
FIGS. 5A to 5B illustrate some embodiments.
Figure 5B:
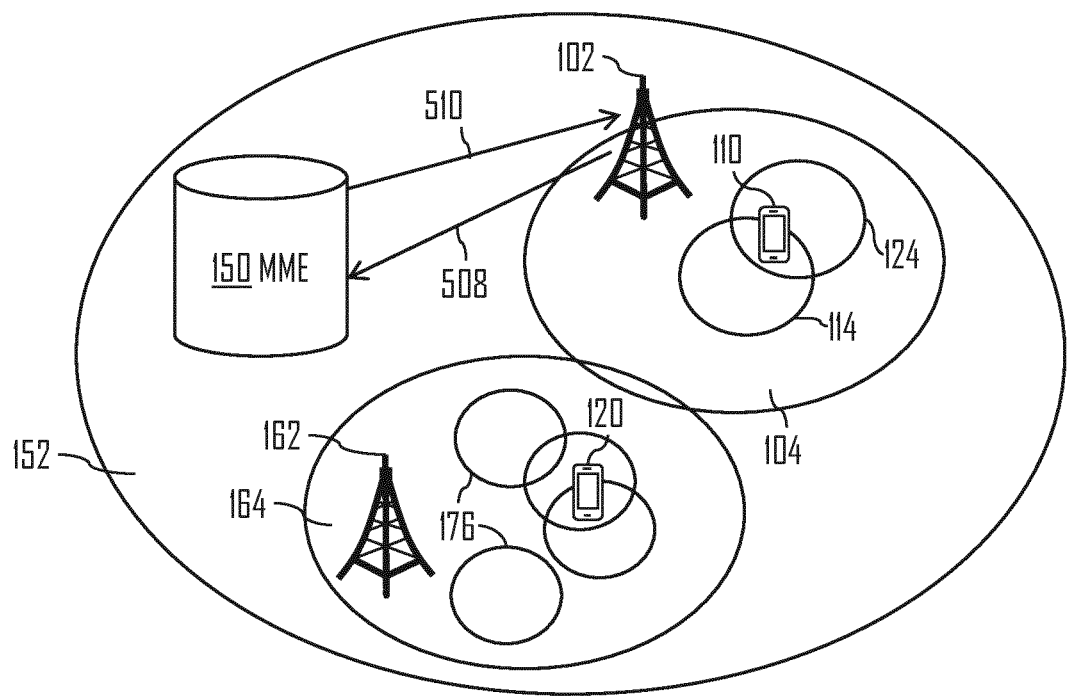

Let us now look closer on the embodiments of the invention with reference to FIGS. 5A to 5B. Referring to FIG. 5A, the terminal device 110 may be located within at least one of the cells 104, 114, 124 provided by the network elements 102, 112, 122. In the example of FIG. 5A, the terminal device 110 is located within all of the cells 104, 114, 124. As described in relation to FIG. 4, the terminal device 110 may select a cell among the cells 104, 114, 124. The terminal device 110 may select a cell that is, in the communication network perspective, suitable for the terminal device 110, that is detectable by the terminal device 110 (sufficient signal level at the terminal device), and/or that provides services that the terminal device 110 requires. For example, signal strength, quality, and/or data transmission throughput of the signal may be used as examples of applicable criteria.

In an embodiment, the selected cell is a cell in which the terminal device 110 is selected to camp on. For example, the terminal device 110 may select to camp on the sub-cell 114. For example, the terminal device 110 may select to camp on the sub-cell 114 and/or the cell 104. For example, the primary camping cell may be the cell 104, but the selected cell may be the sub-cell 114.

In an embodiment, the cell selecting is triggered by a cell reselection and/or a tracking area change. For example, if the terminal device 110 detects that it moves from one cell to another, it may initiate the cell selection process of step 410. For example, the terminal device 110 may move from the cell 164 to the cell 104. Thus, when the terminal device 110 determines that it is in the area of cell 104, it may trigger the selection process. The tracking area change may happen when the terminal device 110 determines that it has moved to a cell that belongs to a different tracking area controlled by a different MME. In such case the terminal device 110 may, for example, first try to perform a traditional tracking area update (TAU) towards the new MME (i.e. MME controlling the detected cell). After the TAU procedure, the terminal device 110 may further transmit the location update request.

Further, for example, if the terminal device 110 is turned on, the powering up may cause the terminal device 110 to initiate the selection process when one or more cells are detected.

In sake of simplicity, the network elements 112, 122 are referred to as local area access nodes 112, 122 hereinafter. However, as well defined above, they may actually be similar and/or equal to the network element 102, for example. Similarly, the cells 114, 124 may be referred to as sub-cells 114, 124.

As described, after the cell selection has been performed, the terminal device 110 may communicate with the provider of the selected cell. For example, the terminal device 110 may select the sub-cell 114 and communicate with the local area access node 112. The communication is indicated with an arrow 502 in FIG. 5A. Similarly, the terminal device 110 could select the cell 104 and/or the sub-cell 124, and communicate with the network element 102 and/or the local area access node 122. However, the selection criteria used for the selection may cause the terminal device 110 to select the sub-cell 114, and to communicate with the local area access node 112.

The communication may comprise transmitting, by the terminal device 110, the location update request to the local area access node 112. Further, the communication may comprise indicating the selected cell. For example, the location update request may comprise the indication of the selected cell (e.g. sub-cell 114). For example, at least one other message may be sent, to the local area access node 112, before, after and/or at the same time compared to the transmission of the location update request, wherein said at least one other message may comprise the indication of the selected cell. For example, the local area access node 112 may determine that the terminal device 110 has selected the sub-cell 114, as the terminal device 110 is communicating (i.e. transmitting the location update request) with the local area access node 112 providing the sub-cell 114.

As described in relation to FIG. 2, the local area access node 112 may acquire the location update request from the terminal device 110. The acquiring may comprise receiving, by the local area access node 112, the location update request from the terminal device 110. The location update request may comprise the terminal device identifier indicating to the local area access node 112 the terminal device 110. Further, the acquiring of the location update request may comprise determining that that the terminal device 110 has selected the sub-cell 114. As explained above, the location update request, received by the local area access node 112 from the terminal device 110, may comprise the indication of the sub-cell 114 (i.e. cell identifier). Further, the determination may be based on that the terminal device 110 transmits some other message(s) indicating the cell 114, and/or on that the terminal device 110 transmits location update request to the local area access node 112. Thus, the location update request does not necessarily comprise cell identifier of the selected cell by the terminal device 110.

The local area access node 112 may transmit and/or forward the acquired location update request to the network element 102. The communication link between the local area access node 112 and the network element 102 may be shown with an arrow 504. For example, X2 interface may be used.

As described in relation to FIG. 3, the network element 102 may receive the location update request from the local area access node 112. The location update request may indicate, to the network element 102, that the terminal device 110 has selected the sub-cell 114. The indication may be based on, for example, cell identifier comprised in the location update request and/or determining that the location update request, comprising the terminal device identifier, is received from the local area access node 112 providing the cell 114. Thus, the forwarded location update request may not necessarily comprise the cell identifier.

In an embodiment, the local area access node 112 is further configured to: for forwarding the location update request as described in step 220 of FIG. 2, adding a cell identifier of the sub-cell 114 to the location update request. As described above, the location update request may be forwarded to the network element 102, for example.

In an embodiment, the local area access node 112 is further configured to: after acquiring the location update request from the terminal device 110, add the cell identifier of the sub-cell 114 to the location update request, and transmit the location update request comprising the cell identifier of the sub-cell 114 to the network element 102. The network element 102 may then apply the cell identifier and the terminal device identifier for updating the cell level location information on the terminal device 110.

Referring to FIG. 5B, the paging process by the MME 150 may be enhanced. The network element 102 may transmit the cell level location information on the terminal device 110 to the MME 150 (arrow 508). Thus, the MME 150 may be aware of the cell level location of the terminal device 110. Therefore, when the MME 150 is initiating paging (arrow 510) towards the terminal device 110, it may know to which network element the paging is beneficial to be sent. Thus, for example, the paging may not be sent to network element 162 if the location of the terminal device 110 is known to be within cell 104 and/or sub-cells 114, 124. Hence, performance of the radio communication network may be enhanced.

Still referring to FIGS. 5A to 5B, the network element 102 may determine, based on the location update request (e.g. received from the local area access node 112), that the terminal device 110 is in coverage of the sub-cell 114 and/or cell 104, the cell 104 being provided by network element 102. Thus, the network element 102 may know, based on the location update request originating from the terminal device 110, that the terminal device 110 is within the cell 104. The determination may be based on that the location update request is received via a local area access node that is within the cell 104 and/or controlled by the network element 102, for example. Further, the network element 102 may update, at least partially based on the determining, the cell level location information on the terminal device 110. The updating may comprise associating at least one cell identifier with the terminal device identifier. The updating may comprise disassociating at least one cell identifier from the terminal device identifier.

In an embodiment, the network element 102 determines the cell level location of the terminal device 110, wherein the cell level location comprises associating at least one cell identifier with the terminal device identifier of the terminal device 110. The at least one cell identifier may comprise a cell identifier of the cell 104 and/or a cell identifier of at least one of the sub-cells 114, 124. Further, also identifiers of sub-cells of the sub-cells 114, 124 may be associated with the terminal device identifier. Naturally, there may be a plurality of hierarchical sub-cell layers which all may be similarly associated at the network element 102 with the terminal device identifier.

In an embodiment, the location update request further comprises cell identifiers of the cells with strongest average received signal quality or strength on different carrier frequencies experienced by a terminal device. The terminal device, such as the terminal device 110, may determine the cell identifiers of the cells with the strongest average received signal quality or strength on different carrier frequencies experienced by the terminal device 110, and transmit the location update request comprising said cell identifiers. Thus, the local area access node 112 may receive the location update request, and forward it to the network element 102, for example. For example, the terminal device 110 may be in coverage of two different cells which provide service on same carrier frequency. The terminal device 110 may determine which of the two cells provides strongest average received signal quality or strength, and indicate that cell's cell identifier with the location update request.

For example, if we look at FIG. 5B, the terminal device 120 may determine signal quality and/or strength of signals received from the access points (e.g. local area access nodes) providing the plurality of sub-cells 176. In a way it may be understood that the signal quality and/or strength may indicate service level of a cell among the plurality of sub-cells 176. The terminal device 120 may further determine for different carrier frequencies (e.g. 3 carrier frequencies shown in Table 1), which cell identifier is associated with strongest signal quality and/or strength. Thus, for each carrier frequency it may be determined, by the terminal device 120, which cell identifier is associated with strongest average received signal quality and/or strength.

Using location update procedure introduced in relation to FIGS. 2 to 4, for example, the terminal device 120 may provide a network element, such as the network element 162, with information on the sub-cells located in the control area of the network element. For example, the terminal device 120 may provide the network element 162 information about the plurality of sub-cells 176. The information may comprise, for example, strongest average received signal quality on different carrier frequencies. Table 1 below illustrates one embodiment of a report where the terminal device 120 may indicate for each carrier frequency a cell that provides the strongest average received signal quality as measured by the terminal device 120.

TABLE 1

| ID (UE) | f1 | f2 | f3 |
| --- | --- | --- | --- |
| GUTI1 | Cell ID#1 | Cell ID#2 | Cell ID#3 |

Referring to Table 1, the report may comprise an identifier of the terminal device 120 and a cell identifier representing the cell providing the strongest average received signal quality for each carrier frequency f1, f2, f3. The terminal device 120 may be camping only in one cell or sub-cell. When carrying out the location update towards a cell or a sub-cell with the strongest average received signal quality on a given carrier frequency, the terminal device 120 may indicate in its location update request whether or not it is also camping in the cell or sub-cell. The network element, such as the network element 162, may receive the location update request as explained above. Thus, the network element may be aware of different cells which may be used to reach the terminal device 120, and to transfer data with the terminal device 120.

Figure 6A:
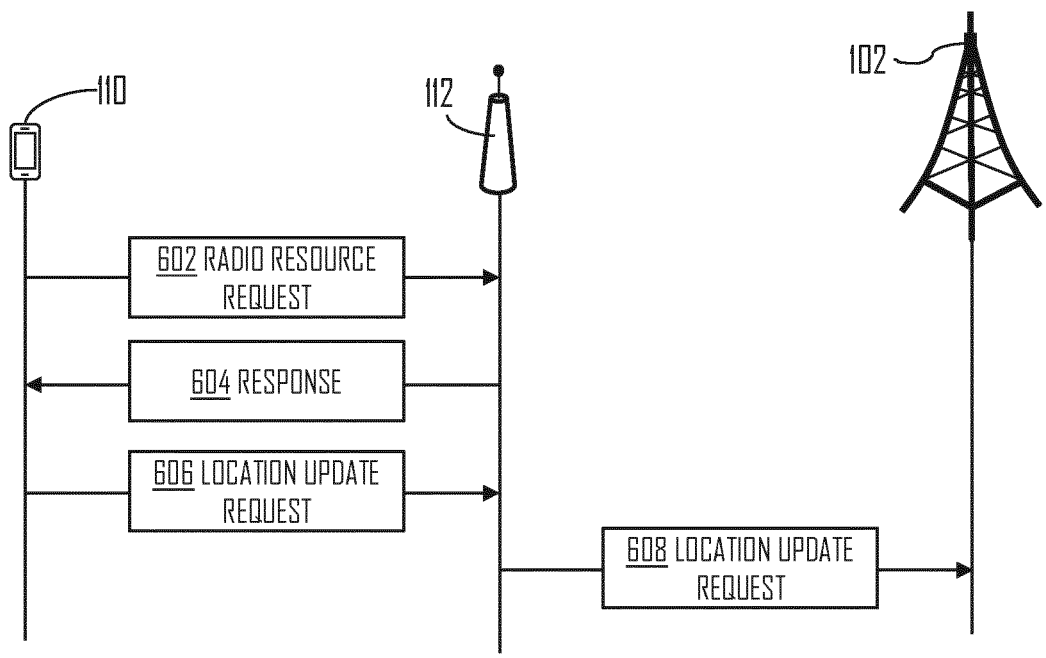
FIGS. 6A to 6B illustrate signal diagrams according to some embodiments.
Figure 6B:
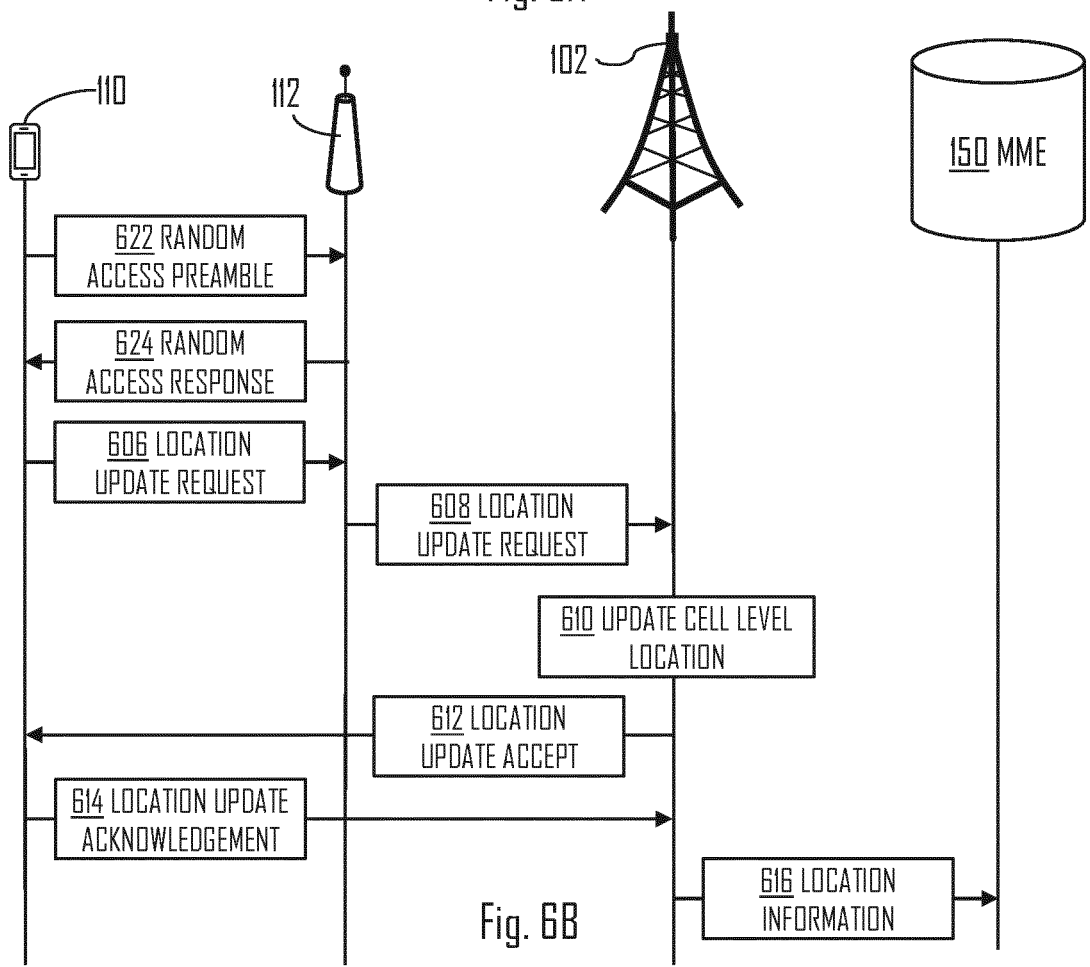

FIGS. 6A to 6B illustrate signal diagrams according to some embodiments of the invention. Referring to FIG. 6A, the acquiring the location update request (step 210 of FIG. 2) may further comprise: receiving, by the local area access node 112, a radio resource request from the terminal device 110 indicating a need to transmit the location update request (block 602); as a response to receiving the radio resource request (block 602), transmitting, by the local area access node 112, a response to the terminal device 110, the response comprising information about an allocation of radio resources to the terminal device 110 (block 604); and receiving, by the local area access node 112 from the terminal device 110, the location update request, the location update request being transmitted, by the terminal device 110, using at least some of the radio resources allocated to the terminal device (block 606). Further, in block 608, the local area access node 112 may forward the location update request to the network element 102. The forwarding may comprise adding the cell identifier of the cell provided by the local area access node to the location update request, for example. The network element 102 may acquire the location update request, for example, by receiving the location update request from the local area access node 112. Examining FIG. 6A from the perspective of the terminal device 110, the communicating, by the terminal device 110, with the local area access node 112 may comprise: transmitting, by the terminal device 110, the radio resource request to the local area access node 112, the radio resource request indicating a need to transmit the location update request (block 602); as a response to transmitting the radio resource request, receiving, by the terminal device, the response from the local area access node 112, the response comprising information about the allocation of radio resources to the terminal device 110 (block 604); and transmitting, by the terminal device 110 to the local area access node 112, the location update request, the location update request being transmitted using at least some of the radio resources allocated to the terminal device (block 606). In an embodiment, the terminal device 110 uses all the radio resources allocated to it for the transmission of the location update request. In an embodiment, the local area access node 112 determines, based on the radio resource request, the amount of needed radio resources for the transmission of the location update request, allocates radio resources to the terminal device 110 based on the needed amount of radio resources, and indicates the allocated radio resources using the response transferred in block 604.

Let us then discuss in general about random access procedure explained later, in FIG. 6B, in relation to the proposed solution. The random access procedure may comprise transmitting, by a terminal device, a Random Access Preamble (RAP) to a network element. The network element 102 may respond with a Random Access Response (RAR) to the terminal device. The terminal device may transmit a first scheduled transmission to the network element based at least partly on the received RAP. The network element may respond with a contention resolution to the terminal device after receiving the first scheduled transmission. The random access procedure may be used, for example, to enable the terminal device to shift from RRC_Idle state to RRC_Connected state. This may enable the terminal device to transfer data with the radio communication network. For example, the terminal device may transmit data to the local area access node 112.

Referring to FIG. 6B, the location update process, described in relation to FIGS. 2 to 4 for example, may be a part of a random access procedure (also called as a special random access) between a terminal device (e.g. terminal device 110) and a network element (e.g. local area access node 112). In block 622, the terminal device 110 may transmit a RAP to the local area access node 112, wherein the RAP may indicate a need to transmit, by the terminal device 110, the location update request. The local area access node 112 may receive the RAP, and determine that the purpose of the random access procedure and/or the transmitted RAP is for indicating the cell level location of the terminal device 110 by transferring the location update request. For example, the RAP may comprise an indicator, such as a one-bit indicator, indicating that the radio resources are requested for the transmission of the location update request. Therefore, the determination, by the local area access node 112 that the RAP is transmitted for indicating the cell level location of the terminal device, may be based on the indicator comprised in the RAP, for example. In an embodiment, the indicator comprises two bits and/or three bits.

The local area access node 112 may transmit, to the terminal device 110, a RAR in response to the received RAP (block 624). The terminal device 110 may receive the RAR. The RAR may comprise, for example, Timing Adjustment (TA), Cell Radio Network Temporary Identifier (C-RNTI) and/or an uplink grant. The RAR may comprise information about the allocation of radio resources to the terminal device 110 by the local area access node 112. Allocation information may be comprised in the uplink grant, for example. The allocated radio resources may be for transmitting, by the terminal device 110, the location update request. The terminal device 110 may become aware of the allocated radio resources based on the received RAR. In an embodiment, the RAR does not comprise the TA. For example, in MTC scenario the distance between a local area access node and a terminal device may be so short that TA is not required at all. This may optimize the data transfer as the amount of control data (i.e. TA value) may not be needed in all cases.

In an embodiment, the terminal device 110 retransmits the RAP for as long as there is no response from the local area access node 112. The retransmitting may stopped when the RAR is received by the terminal device 110.

In block 606, the terminal device 110 may transmit the location update request to the local area access node 112 using the allocated radio resources. The location update request may comprise the terminal device identifier, such as a Globally Unique Temporary ID (GUTI). There may not necessarily be a response to the transmitted location update request. Thus, the terminal device 606 may not necessarily be aware has the radio communication network received the request and/or updated the location. Thus, the location update request may be referred also to as Best Effort tracking area update (BE-TAU), for example.

In an embodiment, the location update request transmitted by the terminal device 110 comprises C-RNTI of the selected cell. Thus, for example, the location update request may comprise C-RNTI of the sub-cell 114. In block 608, the local area access node 112 may transmit the location update request, received from the terminal device 110, to the network element 102. In an embodiment, before transmitting the location update request to the network element 102, the local area access node 112 adds a cell identifier of the sub-cell 114, provided by the local area access node 112, to the location update request, and then transmits the location update request to the network element 102. The local area access node 112 may be aware that the terminal device 110 has selected the sub-cell 114 and/or that the terminal device 110 is located within the area of the sub-cell 114. The location update request may be transmitted (block 608) via X2 interface, for example.

In an embodiment, the terminal device initiates a special random access procedure towards the local area access node 112, wherein the sub-cell provided by the local area access node 112 may not be the primary camping cell of the terminal device 110. Thus, the terminal device 110 may select the sub-cell 114 as described above, wherein the cell 104, provided by the network element 102, may be the primary camping cell.

In block 610, the network element 102 updates the cell level location information on the terminal device 110. For example, information about the sub-cell level location of the terminal device 110 is stored at the network element 102, for example, using a list of GUTIs and their associated sub-cell identifiers. Further, the network element 102 may associate GUTIs of the terminal devices, such as the terminal device 110, with the cell identifier of the cell 104.

In block 616, the network element 102 may transmit location information indicating the cell level location of the terminal device 110 to the MME 150. Thus, the MME 150 may be aware in which cell(s) the terminal device 110 is located in. For example, the MME 150 may be aware, based on the received cell level location information, that the terminal device 110 is within the sub-cell 114 and/or within the cell 104. The cell level location information transmitted in block 616 may be understood as a way to indicate to the MME 150 that the terminal device 110 is associated with the network element 102 and/or the local area access node 112. The MME 150 may thus know more accurately how to reach (e.g. paging process) the terminal device 110.

Still referring to FIG. 6B, in block 612, the network element 102 may, as a response to acquiring (e.g. receiving) the location update request (block 608), transmit a location update accept to the terminal device 110, the location update accept indicating that the network element 102 has received the location update request. In an embodiment, the location update accept indicates that the location update request has been accepted by the network element 102. This may mean, for example, that the network element 102 performs the update of block 610 if it has accepted the location update request.

As a response to transmitting the location update request (block 606), the terminal device 110 may receive the location update accept (transmitted by the network element 102 in block 612), the location update accept indicating that the location update request was received by the network element 102.

In an embodiment, the location update accept (block 612) is transmitted, by the network element 102, via the local area access node 112 to the terminal device 110. For example, the network element 102 may transmit the location update accept via X2 interface to the local area access node 112. The local area access node 112 may receive the location update accept and forward it to the terminal device 110.

In block 614, as a response to receiving the location update accept (block 612), the terminal device 110 may transmit a location update acknowledgement to the network element 102 and/or to the local area access node 112 (block 614), the location update acknowledgement indicating that the location update accept was received by the terminal device 110.

In an embodiment, as a response to transmitting the location update accept (block 612), the network element 102 acquires, from the terminal device 110, the location update acknowledgement indicating that the location update accept was received by the terminal device 110 (block 614). The network element 102 may, for example, receive the location update acknowledgement from the local area access node 112.

In an embodiment, the local area access node 112 acquires, from the terminal device 110, the location update acknowledgement indicating that the location update accept was received by the terminal device 110, the location update accept indicating that the location update request was received by the network element 102. The local area access node 112 may transmit and/or forward the acquired (e.g. received from the terminal device 110) location update acknowledgement to the network element 102.

It should be understood that actions described in relation to blocks 612, 614 may not necessarily be performed. For example, the location update procedure (e.g. BE-TAU procedure) may be performed opportunistically. Thus, the location update request may be transmitted (block 606) by the terminal device 110, wherein local area access node 112 may or may not receive the transmitted location update request. Thus, the network (e.g. local area access node 112 and/or the network element 102) may not necessarily respond using the location update accept even though the location update request would have been received and further the request would have been granted. Naturally, in such case the location update acknowledgement may also be unnecessary to be transmitted.

In an embodiment, the radio resource request (i.e. block 602 of FIG. 6A) is comprised in a RAP, and the response (i.e. block 604 of FIG. 6A) to the radio resource request is comprised in a RAR.

In an embodiment, the radio resource request (i.e. block 602 of FIG. 6A) comprises an indicator for indicating that the radio resources are requested for the transmission of the location update request. Therefore, for example, the terminal device 110 may add the indicator to the radio resources request (e.g. RAP). In an embodiment, the radio resource request (i.e. block 602 of FIG. 6A) comprises an indicator for determining that the radio resources are requested for the transmission of the location update request (i.e. block 602 of FIG. 6A).

In an embodiment, the terminal device 110 transmits a radio resource request indicating a need for transmission. The radio resource request may be a RAP, for example, which is transmitted to the local area access node 112 and/or the network element 102. The local area access node 112 and/or the network element 102 may receive said radio resource request. The terminal device 110 may, as a response to transmitting said radio resource request, receive a response from the local area access node 112 and/or the network element 102, the response comprising information about an allocation of radio resources to the terminal device 110. Thus, the radio resources may be allocated and/or indicated by the local area access node 112 and/or the network element 102 to the terminal device 110. The terminal device 110 may then transmit the location update request using at least some of the radio resources allocated to the terminal device 110 by the local area access node 112 and/or the network element 102. Therefore, the local area access node 112 and/or the network element 102 may not necessarily be aware to which purpose the radio resources are requested for (e.g. by transmitting RAP) by the terminal device 110.

Figure 7:
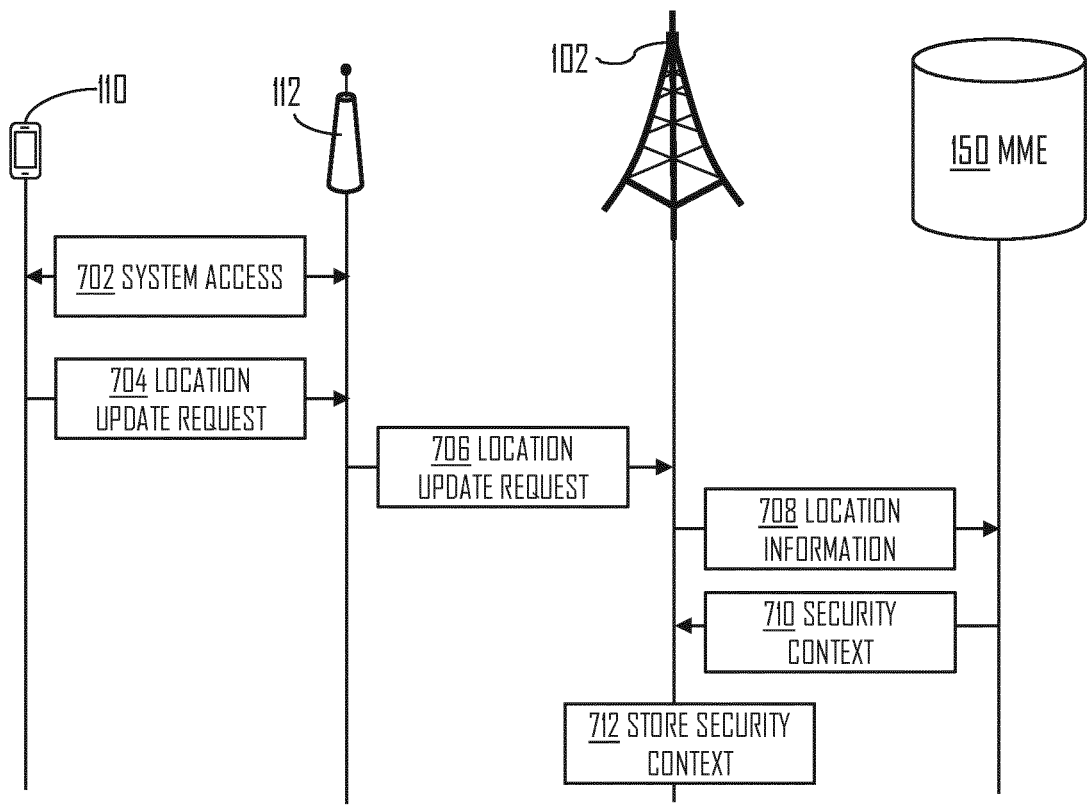
FIG. 7 illustrates a signal diagram according to an embodiment of the invention.

FIG. 7 illustrates a signal diagram according to an embodiment of the invention. Referring to FIG. 7, the terminal device may gain system access on the local area access node 112 (block 702). The system access may mean that the radio resource request is transmitted and the response to the radio resource request is received, and thus the terminal device 110 may have knowledge about radio resource allocation for the location update request. Therefore, in block 704, the terminal device 110 may transmit the location update request. Further, in block 706, the local area access node 112 may forward the location update request to the network element 102. In block 708, the network element 102 may inform the MME 150 about the location of the terminal device 110 and/or some other terminal device(s) (e.g. transmit the cell level location information).

In block 710, the MME 150 may respond to the location information on the terminal device 110 by transmitting, to the network element 102, security context (e.g. AS security context) of the terminal device 110. The security context may enable, for example, secure exchange of Radio Resource Control (RRC) messages between the terminal device 110 and the network element 102. Thus, for example, the security context of the terminal device 110 may be beneficial to be obtained before transmitting and/or receiving, for example, the location update accept and/or the location update acknowledgement.

In block 712, the network element 102 may store the security context of the terminal device 110. Further, the network element 102 may associate the terminal device 110 with the local area access node 112. More broadly, the network element 102 may associate the terminal device 110 with a network element from which the location update request (block 706) was received.

In an embodiment, the network element 102, after receiving the location update request, requests the security context of the terminal device 110 from the MME 150 and/or another network element; and receives the security context of the terminal device from the MME 150 and/or said another network element. Said another network element may be comprised, for example, in a MeNB, wherein the network element 102 is also comprised in a MeNB.

It may also be possible that when the security context is requested, the MME 150 requests information related to the security context of the terminal device 110 from said another network element. Further, the MME 150 may request the said another network element to disassociate the terminal device 110. Said another network element may respond to the request of the MME 150, for example, by informing that the terminal device 110 has been disassociated. Such scenario may be possible, for example, if the terminal device 110 moves from an area (e.g. cell) of said another network element to an area (e.g. cell) of the network element 102, wherein said another network element and the network element 102 belong to the same tracking area.

Figure 8:
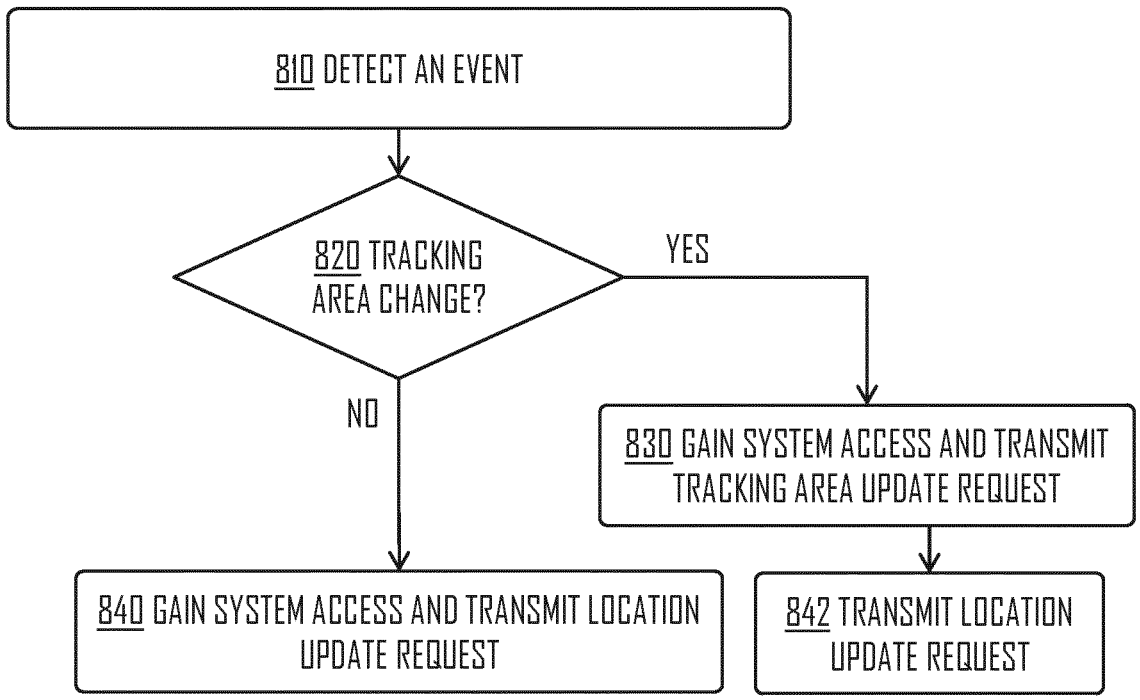
FIG. 8 illustrates a flow diagram according to an embodiment of the invention.

FIG. 8 illustrates a flow diagram according to an embodiment of the invention. Referring to FIG. 8, in block 810, the terminal device 110 may detect an event, such as the cell reselection and/or the tracking area change. In block 820, the terminal device may determine whether the detected event is the tracking area change. If the event is tracking area change, the terminal device 110 may gain system access and transmit TAU request to the cellular communication system (block 830). If the event is not tracking area change, the terminal device 110 may gain system access and transmit location update (e.g. BE-TAU) request to the cellular communication system (block 840). After block 830, the terminal device 110 may transmit the location update request (block 842). Note that the system access may be available as the terminal device may have already transmitted the TAU request in block 830.

In an embodiment, when the terminal device 110 carries out cell reselection between cells which are found in the same intra-frequency layer or different inter-frequency layers, it performs the location update procedure, described for example in relation to FIG. 4, towards the selected cell.

In an embodiment, the network element 102 and/or the local area access node determines that a mobility of the terminal device 110 is over a threshold; and as a response to the determining, transmits, to the terminal device 110, a control message preventing the terminal device 110 from performing location update request(s) on cell reselections within the cell(s) provided by the network element 102 and/or the local area access node 112. For example, the network element 102 may use Service Identity (SI), Mobility State Estimation (MSE) and/or some other means of estimating the terminal device velocity. For example, if the terminal device 110 is moving above pedestrian velocities, described method may be used to prevent the terminal device 110 from transmitting the location update request(s). In one example, if the mobility state is medium and/or high, then the location update request(s) should be suspended for sub-cells, such as the sub-cell 114. In one example, the mobility of the terminal device 110 may be estimated by the terminal device, and the terminal device 110 may then determine whether the mobility is over the threshold. The threshold may be preconfigured to the terminal device 110 and/or it may be transmitted (i.e. broadcasting, dedicated signaling) by the cellular communication system (e.g. network element 102) to the terminal device 110.

Looking at the FIG. 5B, there may be a plurality of sub-cells 176 within the cell 164, for example. It may be beneficial to prevent the terminal device 110 from performing the location update procedure when the terminal device 110 is moving within at least some of the plurality of sub-cells 176. Further, the plurality of sub-cells 176 may have dormancy cycles meaning that they take turns being on and off. The dormancy cycles may be controlled by the network element 162, for example. However, the dormancy cycles may cause increase in terminal device battery consumption due to increasing number of location update procedures. Therefore, the network element 162 and/or the network element 102 may create a cluster of sub-cells, wherein the terminal device 110, associated to at least one of the sub-cells, may not carry out location update procedure when a cell reselection, among the other sub-cells of the cluster of sub-cells, is detected. Thus for example, a paging message may be transmitted through all the sub-cells of the cluster of sub-cells and/or further through the cell 164.

In an embodiment, looking at the FIG. 5B, there may be a plurality of sub-cells 176 within the cell 164. For example, in micro cellular millimeter wave communication consisting of plurality of access points providing the plurality of sub-cells 176, it may be beneficial for the terminal device 120 to transmit the location update request (block 606) to more than one access point each providing one or more of the plurality of sub-cells 176. This may help to avoid the location update request transmission being blocked by an obstacle, or when multiple transmission beams are used, transmit the location update request using plurality of beams. Further, network element, such as the network element 162, managing the plurality of access points may transmit the location update accept (block 612) using multiple beams to the terminal device 120. In an embodiment, the network element 102 limits rate of the triggered location update procedures by implementing a timer and/or counter to the terminal device 110. In another embodiment, the terminal device 110 implements the time and/or counter itself by using preconfigured information. For example, the network element 102 may implement the timer to be used when the terminal device 110 is within certain sub-cell(s). For example, the timer and/or counter may prevent the terminal device 110 from carrying out the location update procedure more than once within a certain time period. For example, when the terminal device 110 transmits the location update request, the network (e.g. network element 102) may answer with the location update accept, wherein the location update accept may comprise the timer and/or counter information. For example, the network element 102 may request the terminal device 110 not to perform another location update procedure within the next 100 seconds.

In an embodiment, the network element 102 is further configured to perform operations comprising: generating a cluster of sub-cells provided by the at least one local area access node; determining that the terminal device is within the cluster of sub-cells; and transmitting, to the terminal device 110, a control message preventing the terminal device 110 from performing location update requests on cell reselections within the cluster of sub-cells.

In an embodiment, the terminal device is further configured to perform operations comprising: receiving, from the cellular communication system, a control message requesting the terminal device 110 to stop performing location update requests on cell reselections within at least one cell; and based on the control message, restraining from performing location update requests within said at least one cell.

In an embodiment, the location update procedure (e.g. the special random access procedure) is transmitted with a lower power compared to the normal random access procedure. This may, for example, mean that at least the RAP for the special purpose is transmitted with lower power compared to normal RAP. Thus, the special random access procedure (for the location update on cell level) may not substantially interfere with the normal random access procedure.

The above described solution may bring some benefits. First, size of a terminal device tracking area may be decreased by using the location update procedure. Therefore, the geographical area in which the terminal device 110 needs to be paged may be smaller compared to the conventional tracking area which may not comprise cell level location of the terminal device 110 or other terminal devices.

Second, the method may provide robustness and a fall back solution. If the location update procedure fails (e.g. cell level location of the terminal device 110 is not known), the terminal device 110 may still be located within the larger tracking area based on the TAU procedure.

Third, the proposed method may be suitable for MTC or IoT type of communications, wherein the mobility of the terminal devices is small or non-existent. This is considered a benefit since the volume of IoT devices is expected to be very high and paging resources may need to be optimized. These devices may need to change the sub-cell due to radio reasons or maintenance break(s) even if the device tracking remains the same.

Fourth, the proposed method may minimize the required additional signaling for sub-cells while providing the better granularity of paging area.

Fifth, the terminal device location information at sub-cell level may additionally be used for several purposes. For example, the user context information may be directly exploited in the sub-cells, e.g. for fast connection setup towards the sub-cell. The cellular communication system (e.g. network element 102) may determine the length of time that user context information is stored in the sub-cell and the terminal device. Another example may be to facilitate dormant cell state transition. In one case if a downlink data is available for a terminal device whose location is known at sub-cell level, the cellular communication system (e.g. network element 102) may send a 'WAKE_UP' message to the sub-cell, if it is in dormant state, while simultaneously sending a paging message to the terminal device, e.g. through a macro cell (e.g. cell 104). In another case, the network may identify the frequently associated sub-cells to a terminal device through location update procedure, and may send 'WAKE_UP' message to the cells which are in dormant state among the frequently associated cells while a downlink data is available for the terminal device. Further, if a terminal device chooses a macro cell to camp on and its location at sub-cell level is known, the cellular communication system may transfer downlink data, for the terminal device, to the sub-cell while at the same time trying to reach the terminal device through the macro cell.

Figure 9:
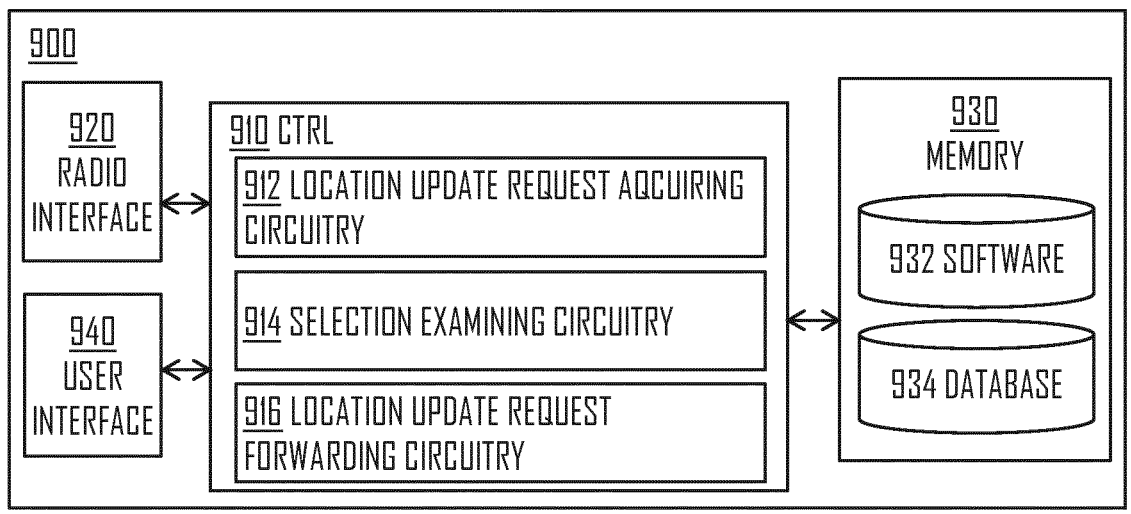
FIGS. 9 to 11 illustrate apparatuses according to some embodiments of the invention.
Figure 10:
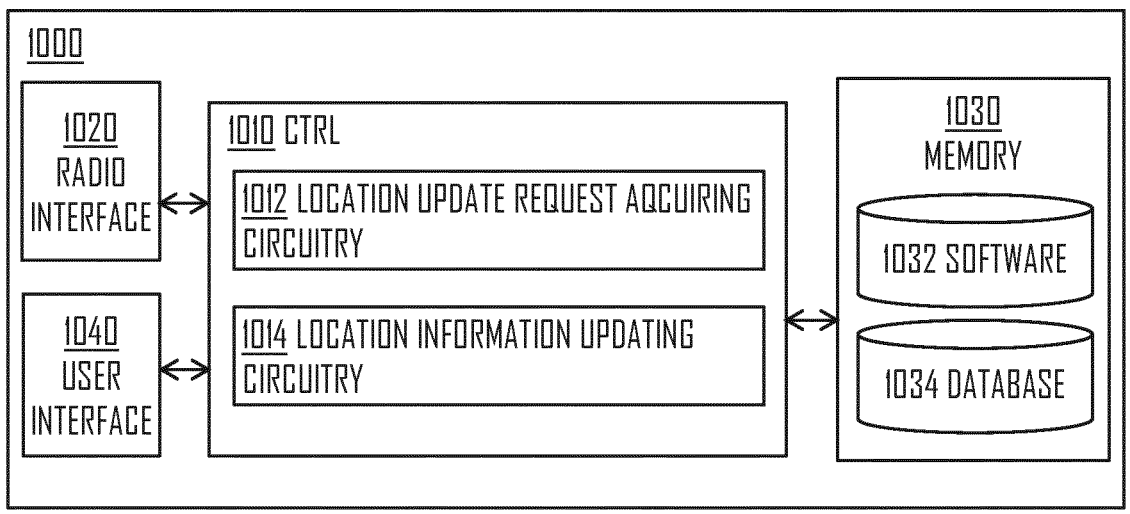
Figure 11:
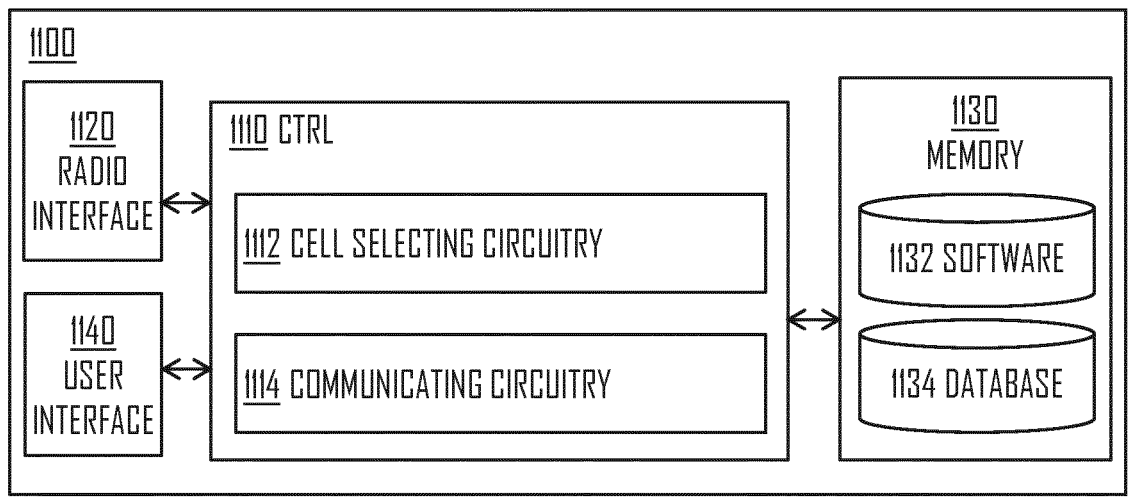

FIGS. 9 to 11 provide apparatuses 900, 1000, 1100 comprising a control circuitry (CTRL) 910, 1010, 1110, such as at least one processor, and at least one memory 930, 1030, 1130 including a computer program code (software) 932, 1032, 1132, wherein the at least one memory and the computer program code (software) 932, 1032, 1132, are configured, with the at least one processor, to cause the respective apparatus 900, 1000, 1100 to carry out any one of the embodiments of FIGS. 1 to 8, or operations thereof.

In an embodiment, these operations may comprise tasks, such as, acquiring, by a first network element of a cellular communication system providing a first cell, a location update request from a terminal device within the first cell, wherein the location update request is related to a cell level location of the terminal device, and wherein the location update request comprises a terminal device identifier; and examining that the terminal device has selected the first cell; and forwarding the location update request to a second network element of the cellular communication system.

In an embodiment, these operations may comprise tasks, such as, acquiring, by a second network element of a cellular communication system, a location update request in relation to a terminal device from a first network element of the cellular communication system providing a first cell, wherein the location update request comprises a terminal device identifier of the terminal device, and wherein the location update request indicates that the terminal device has selected the first cell; and based on the location update request, updating cell level location information on the terminal device.

In an embodiment, these operations may comprise tasks, such as, selecting, by a terminal device of a cellular communication system, a cell among one or more cells of the cellular communication system; and communicating with a network element providing the selected cell, wherein the communicating comprises: transmitting a location update request to the network element, the location update request being associated with a cell level indication of a terminal device location, wherein the location update request comprises a terminal device identifier and an indication of the selected cell.

Referring to FIGS. 9 to 11, the memory 930, 1030, 1130, may be implemented using any suitable data storage technology, such as semiconductor based memory devices, flash memory, magnetic memory devices and systems, optical memory devices and systems, fixed memory and removable memory. The memory 930, 1030, 1130 may comprise a database 934, 1034, 1134 for storing data, such as the cell level location information on a terminal device(s).

The apparatuses 900, 1000, 1100 may further comprise radio interface (TRX) 920, 1020, 1120 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas.

The apparatuses 900, 1000, 1100 may comprise user interface 940, 1040, 1140 comprising, for example, at least one keypad, a microphone, a touch display, a display, a speaker, etc. The user interface 940, 1040, 1140 may be used to control the respective apparatus by a user of the apparatus 900, 1000, 1100.

In an embodiment, the apparatus 900 may be or be comprised in a base station (also called a base transceiver station, a Node B, a radio network controller, or an evolved Node B, for example). The apparatus 900 may be the local area access node 112, for example. Further, the apparatus 900 may be the first network element performing the steps of FIG. 2. In an embodiment, the apparatus 1000 is comprised in a SeNB.

Referring to FIG. 9, the control circuitry 910 comprises a location update request acquiring circuitry 912 configured to acquire a location update request from a terminal device within a first cell provided by a first network element of a cellular communication system, wherein the location update request is related to a cell level location of the terminal device, and wherein the location update request comprises a terminal device identifier; a selection examining circuitry 914 configured to examine that the terminal device has selected the first cell; and a location update request forwarding circuitry 916 configured to forward the location update request to a second network element of the communication system.

In an embodiment, the apparatus 1000 may be or be comprised in a base station (also called a base transceiver station, a Node B, a radio network controller, or an evolved Node B, for example). The apparatus 1000 may be the network element 102, for example. Further, the apparatus 1000 may be the second network element performing the steps of FIG. 3, for example. In an embodiment, the apparatus 1000 is comprised in a MeNB.

Referring to FIG. 10, the control circuitry 1010 comprises a location update request acquiring circuitry 1012 configured to acquire a location update request in relation to a terminal device from a first network element of the cellular communication system providing a first cell, wherein the location update request comprises a terminal device identifier of the terminal device, and wherein the location update request indicates that the terminal device has selected the first cell; and a location information updating circuitry 1014 configured to update, based on the location update request, cell level location information on the terminal device.

In an embodiment, the TRX may provide the apparatus 900 connection to an X2 interface. In an embodiment, the TRX may provide the apparatus 1000 connection to an X2 interface. The X2 interface may be the X2 interface 190, for example.

In an embodiment, the apparatus 1100 may be or be comprised in a terminal device, such as a mobile phone or cellular phone, for example. The apparatus 1100 may be the at least one terminal device 110, 120, 130, 140, for example. In an embodiment, the apparatus 1100 is the terminal device performing the steps of FIG. 4. In an embodiment, the apparatus 1100 is comprised in the terminal device 110, in the terminal device 120, in the terminal device 130, and/or in the terminal device 140.

Referring to FIG. 11, the control circuitry 1110 may comprise a cell selecting circuitry 1112 configured to select a cell among one or more cells of a cellular communication system; and a communicating circuitry 1114 configured to communicate with a network element providing the selected cell, wherein the communicating comprises: transmitting a location update request to the network element, the location update request being associated with a cell level indication of a terminal device location, wherein the location update request comprises a terminal device identifier and an indication of the selected cell.

Figure 12:
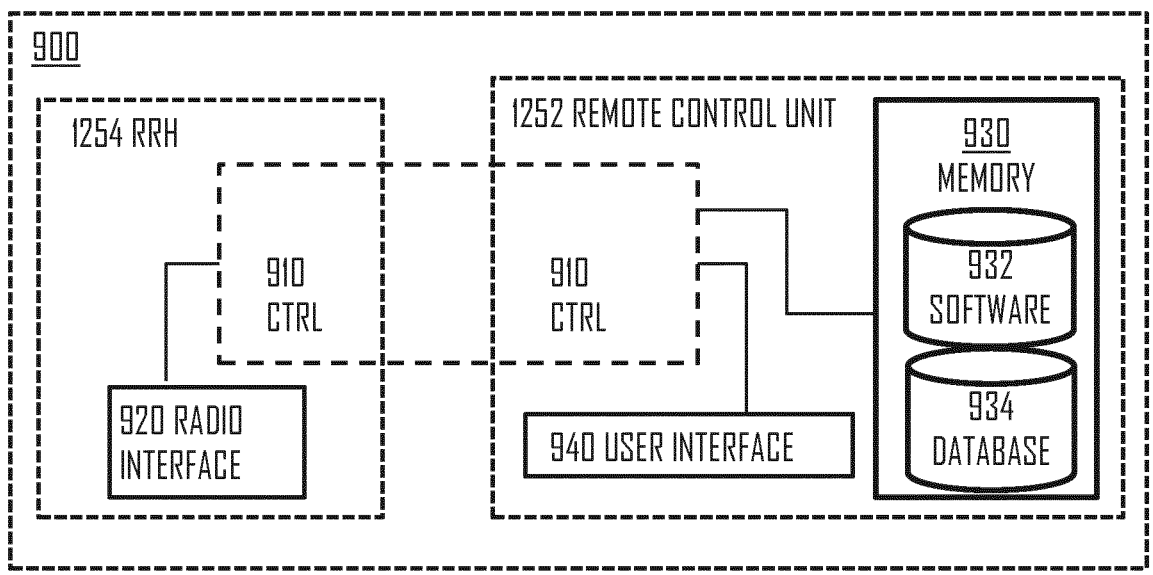
FIG. 12 illustrates an embodiment of the invention.

In an embodiment, as shown in FIG. 12, at least some of the functionalities of the apparatus 900 may be shared between two physically separate devices, forming one operational entity. Therefore, the apparatus 900 may be seen to depict the operational entity comprising one or more physically separate devices for executing at least some of the described processes. Thus, the apparatus 900 of FIG. 9, utilizing such shared architecture, may comprise a remote control unit (RCU) 1252, such as a host computer or a server computer, operatively coupled (e.g. via a wireless or wired network) to a remote radio head (RRH) 1254 located in the base station. In an embodiment, at least some of the described processes may be performed by the RCU 1252. In an embodiment, the execution of at least some of the described processes may be shared among the RRH 1254 and the RCU 1252.

In an embodiment, the RCU 1252 may generate a virtual network through which the RCU 1252 communicates with the RRH 1254. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

It should be appreciated that at least some of the functionalities of the apparatus 1000 may also be shared between two or more physically separate devices, forming one operational entity. Thus, the FIG. 12 could as well illustrate shared functions of the apparatus 1000. In an embodiment, the apparatuses 900, 1000 are comprised in a same physical entity. The physical entity may be a physical apparatus, such as a server and/or a host. Said server and/or host may thus perform some and/or all of the functions performed by the apparatuses 900, 1000. For example, it may be beneficial to implement capability to perform the functions of FIGS. 2 and 3 into one server in order to decrease complexity of manufacturing process(es). As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 8 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 8 or operations thereof. In an embodiment, these operations may comprise tasks, such as, acquiring, by a first network element of a cellular communication system providing a first cell, a location update request from a terminal device within the first cell, wherein the location update request is related to a cell level location of the terminal device, and wherein the location update request comprises a terminal device identifier; and examining that the terminal device has selected the first cell, and forwarding the location update request to a second network element of the cellular communication system. In an embodiment, these operations may comprise tasks, such as, acquiring, by a second network element of a cellular communication system, a location update request in relation to a terminal device from a first network element of the cellular communication system providing a first cell, wherein the location update request comprises a terminal device identifier of the terminal device, and wherein the location update request indicates that the terminal device has selected the first cell; and based on the location update request, updating cell level location information on the terminal device. In an embodiment, these operations may comprise tasks, such as, selecting, by a terminal device of a cellular communication system, a cell among one or more cells of the cellular communication system; and communicating with a network element providing the selected cell, wherein the communicating comprises: transmitting a location update request to the network element, the location update request being associated with a cell level indication of a terminal device location, wherein the location update request comprises a terminal device identifier and an indication of the selected cell.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 8, or operations thereof. In an embodiment, these operations may comprise tasks, such as, acquiring, by a first network element of a cellular communication system providing a first cell, a location update request from a terminal device within the first cell, wherein the location update request is related to a cell level location of the terminal device, and wherein the location update request comprises a terminal device identifier; and examining that the terminal device has selected the first cell, and forwarding the location update request to a second network element of the cellular communication system. In an embodiment, these operations may comprise tasks, such as, acquiring, by a second network element of a cellular communication system, a location update request in relation to a terminal device from a first network element of the cellular communication system providing a first cell, wherein the location update request comprises a terminal device identifier of the terminal device, and wherein the location update request indicates that the terminal device has selected the first cell; and based on the location update request, updating cell level location information on the terminal device. In an embodiment, these operations may comprise tasks, such as, selecting, by a terminal device of a cellular communication system, a cell among one or more cells of the cellular communication system; and communicating with a network element providing the selected cell, wherein the communicating comprises: transmitting a location update request to the network element, the location update request being associated with a cell level indication of a terminal device location, wherein the location update request comprises a terminal device identifier and an indication of the selected cell.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising at least one processor, and at least one memory comprising a computer program code, wherein the processor, the memory, and the computer program code are configured to cause a first network element of a cellular communication system providing a first cell to:

acquire, by the first network element, a location update request from a terminal device within the first cell, wherein the location update request is related to updating a cell level location of the terminal device, and wherein the location update request comprises a terminal device identifier, and examine that the terminal device has selected the first cell, and forwarding the location update request to a second network element of the cellular communication system providing a second cell, wherein the location update request comprises the terminal device identifier and indicates that terminal device has selected the first cell.

2. The apparatus of claim 1, wherein the at least one memory and the computer program code are configured, with the at least one processor, to cause the first network element further to:

add a cell identifier of the first cell to the location update request.

3. The apparatus of claim 1, further comprising causing the apparatus, with regard to the acquiring the location update to:

receive a radio resource request from the terminal device indicating a need to transmit the location update request;

as a response to receiving the radio resource request, transmit a response to the terminal device, the response comprising information about an allocation of radio resources to the terminal device, and receive, from the terminal device, the location update request, in at least some of the radio resources allocated to the terminal device.

4. The apparatus of claim 1, wherein the at least one memory and the computer program code are configured, with the at least one processor, to cause the first network element further to:

acquire, from the terminal device, a location update acknowledgement indicating that a location update accept was received by the terminal device, the location update accept indicating that the location update request was received by the second network element.

5. An apparatus at least one processor and at least one memory including a computer program code, wherein the at least one memory and the computer program code are configured, with the at least one processor, to cause a second network element of a cellular communication system proving a second cell to:

acquire, by the second network element, a location update request in relation to a terminal device from a first network element of the cellular communication system providing a first cell, wherein the location update request comprises a terminal device identifier of the terminal device, and wherein the location update request indicates that the terminal device has selected the first cell, and based on the location update request, update cell level location information on the terminal device by associating at least one cell identifier with the terminal identifier.

6. The apparatus of claim 5, wherein the location update request further comprises a cell identifier of the first cell.

7. The apparatus of claim 5, wherein the location update request further comprises a cell identifier of at least one cell with strongest average received signal quality and/or strength on different carrier frequencies experienced by the terminal device.

8. The apparatus of claim 5, wherein the at least one memory and the computer program code are configured, with the at least one processor, to cause the second network element further to:

determine, based on the location update request, that the terminal device is in the coverage of at least one of the first cell and the second cell, and update, at least partially based on the determining, the cell level location information on the terminal device.

9. The apparatus of claim 5, wherein the at least one memory and the computer program code are configured, with the at least one processor, to cause the second network element further to:

as a response to the acquiring the location update request, transmit a location update accept to the terminal device, the location update accept indicating that the second network element has received the location update request.

10. The apparatus of claim 5, wherein the at least one memory and the computer program code are configured, with the at least one processor, to cause the second network element further to:

transmit the cell level location information on the terminal device to a mobility management entity.

* * * * *